Patented Apr. 10, 1951

2,548,171

UNITED STATES PATENT OFFICE 2,548,171

PREPARATION OF SATURATED ALDEHYDES FROM UNSATURATED ALCOHOLS BY MEANS OF METAL CARBONYLS

Robert Thorwald Olsen, Belvidere, N. J., assignor to General Aniline & Film Corporation, New York, N. Y., a corporation of Delaware No Drawing. Application November 5, 1948, Serial No. 58,613

5 Claims. (Cl. 260—601)

The present invention relates to the preparation of saturated aldehydes by treatment of unsaturated alcohols in the presence of an alkali with a metal carbonyl.

The usual method of preparing aldehydes involves the oxidation of the corresponding alcohol. These procedures have the disadvantage that the reaction must be carefully controlled so as to insure that it does not go beyond the aldehyde to the acid stage.

I have now found that saturated aldehydes may be readily prepared from unsaturated alcohols with no danger of the aldehyde being converted to the corresponding carboxylic acid by the treatment of the unsaturated alcohol in the presence of an alkali with a metal carbonyl. The dehydrogenation-reduction reaction involved in this method does not proceed by a mechanism of normal oxidation and therefore the aldehyde is not further oxidized to the acid.

It is known that the metal carbonyls are relatively unstable compounds, being easily disassociated into its components, to wit, the metal and carbon monoxide. It was therefore rather surprising that these substances could be used to effect the double function of reducing the unsaturation in an unsaturated alcohol while simultaneously converting the alcoholic hydroxyl group to an aldehydic group.

It is accordingly an object of the present invention to produce saturated aldehydes by the treatment of an unsaturated alcohol in the presence of an alkali with a metal carbonyl.

It is a further object of the present invention to convert unsaturated alcohols into saturated aldehydes by treating the same at elevated temperatures with a metal carbonyl in the presence of an alkali.

Other and further important objects of the invention will become apparent as the description proceeds.

The process for converting the unsaturated alcohol into the aldehyde involves a mixing of the alcohol, metal carbonyl and a relatively strong alkali. After the exothermic reaction which sets in has subsided, the reaction mixture is heated for several hours to a temperature ranging from about 60 to 100° C. The saturated aldehyde thus formed may be isolated by distillation from the reaction mixture, or it may be retained in the mixture to undergo condensation reaction with itself in the presence of the alkali to form higher unsaturated and saturated aldehydes. If the alkali employed be very concentrated, and the reaction be permitted to proceed for a relatively long length of time, the so-called aldol-aldehydes undergo the Cannizzaro reaction with the formation of higher saturated alcohols.

The reaction leading to the formation of the saturated aldehyde, assuming that the parent material is allyl alcohol, may be represented by the following equations:

(a) $CH_2=CHCH_2OH + Fe(CO)_5 + alkali \rightarrow$
    $CH_2=CH-CHO + H_2Fe(CO)_4 + HCO_2\ alkali$ (b) $CH_2=CH-CHO + 3H_2Fe(CO)_4 \rightarrow$
    $CH_3-CH_2-CHO + [Fe(CO)_4]_3$ The unsaturated alcohols which are employed for the conversion may be olefine alcohols, mono or poly, straight chain or cyclic, or may be acetylene alcohols. These alcohols may be more precisely characterized by the following formulae:

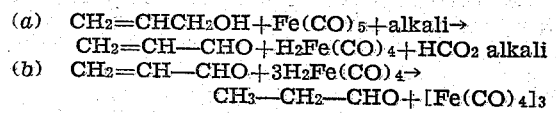

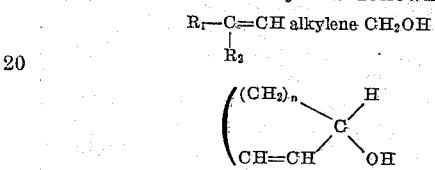

and $$R-C\equiv CCH_2OH$$

wherein $R_1$ is hydrogen, alkyl such as methyl, ethyl, propyl, butyl, octyl, nonyl and the like, aryl such as phenyl and the like, alkylene such as isohexylene, or alkylol such as methylol and the like, $R_2$ is hydrogen or alkyl, R is hydrogen, alkyl as above, or alkylol as above, and $n$ is 3 or 4.

Examples of straight chain olefine alcohols contemplated herein are allyl alcohol, crotyl alcohol, cinnamyl alcohol, 4-penten-1-ol, oleyl alcohol, elaidyl alcohol, geraniol, 2-methyl-butene-2-ol-4, 2-methyl-pentene-2-ol-5, 3-ethyl-pentene-2-ol-1 and 1.4-butenediol.

Examples of cyclo olefinic alcohols are cyclohexene-1-ol-3 and cycloheptene-1-ol-3.

Examples of acetylenic alcohols are propargyl alcohol, propargyl carbinol, gamma-n-amyl propargyl alcohol, gamma-n-hexyl propargyl alcohol, 1.4-butynediol, and the like.

The metal carbonyls which are found to be effective are those capable of forming metal hydrocarbonyls. Examples of such metal carbonyls are iron penta carbonyl, cobalt tetracarbonyl, and the like.

The alkali employed may be any relatively strong water-soluble alkali, such as potassium hydroxide, ammonium hydroxide, sodium hydroxide, sodium alcoholate such as sodium methylate, sodium ethylate and the like, calcium hydroxide, magnesium hydroxide, aluminum hydroxide, sodium dimethylamino acetate and trisodiumphosphate.

The reaction is preferably carried out in the presence of a solvent which may be water or an organic solvent such as ethanol, methanol, toluene, etc. The particular solvent selected will be dictated by the solubility characteristics of the unsaturated alcohol employed.

The temperature at which the reaction is effected will vary depending upon the particular components employed in the reaction mixture. Generally, however, the temperature will range from about 20 to 100° C. and may be maintained at the desired degree by heating the reaction mixture to reflux.

The particular aldehydes which are formed will depend to a large extent upon the ratio of the reactants and the time and temperature of the heating of the reaction mixture. Generally there is employed about 1 to 14 mols of the alcohol for each mol of the metal carbonyl. On the other hand, the quantity of alkali used may range from 2 mols for each mol of the alcohol to .2 mol. The reaction mixture may be heated for a period of time ranging from .2 hour to 12 hours. The particular effects accruing from a variation of the proportions, temperature and time of heating are depicted by Examples 2 to 11 inclusive.

During the reaction the metal carbonyl is, in most cases, converted to a metal carbonate, bicarbonate and the metal of the carbonyl.

The invention may be illustrated by the following examples, but it is to be understood that these are exemplary and not restrictive.

*Example 1*

Into a 1-liter, 4-necked flask equipped with a stirrer, thermometer, dropping funnel and condenser, and arranged for downward distillation, are placed 145 grams (2.5 mols) of allyl alcohol and 98 grams (.5 mol) of iron pentacarbonyl. The solution is heated on a steam bath to 55° C. whereupon there is added 75 ml. (.85 mol) of 33% aqueous sodium hydroxide in six portions over a period of 1½ hours. The distillate which comes over is collected at a temperature below 80° C. by reason of the exothermic reaction. The reaction mixture becomes brick red on the first addition of the alkali. Further alkali results in the production of a white precipitate and then the solid slowly becomes black. The distillate consists of two layers and from the upper layer there is isolated by fractional distillation 20.5 grams of propionaldehyde boiling at 47–51° C.

*Example 2*

Into a 3-liter, 4-necked flask, equipped with a stirrer, thermometer, reflux condenser and nitrogen inlet tube are placed 1.5 mols of 10% aqueous sodium hydroxide, 147 grams (.75 mol) of iron pentacarbonyl and 377 grams (6.5 mols) of allyl alcohol.

The mixture is swept with nitrogen and the spontaneous heat evolution controlled by external cooling in such a way that the temperature is maintained at 65 to 70° C. After the exothermic reaction has abated, the mixture is heated at 80° C. for 2 hours and to it are added 400 ml. of water. By steam distilling, extracting the distillate with ether, and distilling off the ether, an oil is obtained from which there was isolated by fractionation 50.9 grams of 2-methylvaleraldehyde, boiling at 117 to 124.2° C. and 100 grams of 2 methyl-2-pentenal, boiling at 71 to 74° C. at 70 mm. of mercury.

*Example 3*

The procedure of Example 2 was followed while utilizing 2.5 mols of allyl alcohol, .75 mol of iron carbonyl, 5 mols of sodium hydroxide, and refluxing the reaction mixture for 4 hours at 96° C. There were isolated from the reaction mixture .02 mol of 2-methyl-2-pentenal and .07 mol of 2-methyl-pentanol.

*Example 4*

The procedure of Example 2 was followed while utilizing 2.5 mols of allyl alcohol, .75 mol of iron carbonyl, .56 mol of aqueous sodium hydroxide, and refluxing the reaction mixture for 2 hours at 70° C. There were isolated from the reaction mixture .11 mol of propionaldehyde, .03 mol of 2-methylvaleraldehyde and .11 mol of 2-methyl-2-pentenal. The iron carbonyl employed was converted to a mixture of iron and iron carbonate.

*Example 5*

The procedure of Example 2 was followed while utilizing 3.17 mols of allyl alcohol, .25 mol of iron carbonyl, .75 mol of aqueous sodium hydroxide, and refluxing the reaction mixture at 80° C. for ½ hour. There were isolated from the reaction mixture .5 mol of 2-methyl valeraldehyde and .5 mol of 2-methyl-2-pentenal.

*Example 6*

The procedure of Example 2 was followed while utilizing 2.5 mols of allyl alcohol, .5 mol of iron carbonyl, 1 mol of sodium methylate, toluene as the solvent, and heating the reaction mixture for 5 hours at 90 to 95° C. There were isolated from the reaction mixture .17 mol of propionaldehyde, .5 mol of an aldehyde mixture, boiling at 55°/760 mm. to 95°/2 mm. and .35 mol of allyl alcohol.

*Example 7*

The procedure of Example 2 was followed while employing 3.17 mols of allyl alcohol, .25 mol of iron carbonyl, 1 mol of aqueous sodium hydroxide, and heating the reaction mixture at 80° C. for .2 hour. There were isolated from the reaction mixture about .29 mol of propionaldehyde and about .29 mol of an aldehyde mixture boiling at 75 to 143° C.

*Example 8*

The procedure of Example 2 was repeated while employing 2 mols of allyl alcohol, .5 mol of iron carbonyl, 1 mol of sodium dimethylamino acetate, water as the solvent, and heating the reaction mixture at 90 to 95° C. for 10½ hours. The reaction mixture yields .12 mol of propionaldehyde and .2 mol of 2-methyl-pentanol.

*Example 9*

The procedure of Example 2 was followed while utilizing 2.5 mols of allyl alcohol, .5 mol of iron carbonyl, 1.5 mols of calcium hydroxide, with water as the solvent, and heating the reaction mixture to 85° C. for ½ hour. The reaction mixture yields .03 mol of propionaldehyde, .09 mol of 2-methylvaleraldehyde, .02 mol of 2-methyl-2-pentenal and .12 mol of 2-methyl-pentanol.

*Example 10*

The procedure of Example 2 was followed while utilizing 2.5 mols of allyl alcohol, .5 mol of iron carbonyl, 1.5 mols of magnesium hydroxide, with water as the solvent, and heating the reaction mixture at 85° C. for 10 hours. There were isolated from the reaction mixture .12 mol of propionaldehyde, .1 mol of 2-methylvaleraldehyde and 1.3 mol of 2-methyl-2-pentenal.

*Example 11*

The procedure of Example 2 was followed while employing 2.5 mols of allyl alcohol, .5 mol of iron carbonyl, 1.5 mols of aluminum hydroxide, with water as the solvent, and heating the reaction mixture at 75° C. for a period of 12 hours. The reaction mixture yielded .12 mol of propionaldehyde and .07 mol of 2-methyl-2-pentenal.

*Example 12*

Into a 500 ml. 4-necked flask equipped with a stirrer, thermometer, reflux condenser and dropping funnel were placed 86 grams (1 mol) of 4-pentenol-1, 100 ml. (.278 mol) of 10% aqueous sodium hydroxide and 40 grams (.2 mol) of iron pentacarbonyl. The mixture formed a dark reddish-brown emulsion. To it was added 25 ml. of methanol to obtain homogeneity and the mixture was then refluxed at 80° C. on a steam bath for 5 minutes. The condenser was arranged for downward distillation and 100 ml. of distillate were collected. From the upper two layers were isolated by fractional distillation 37.4 grams of recovered 4-pentenol-1 and 6.6 grams of colorless n-valeraldehyde boiling at 98 to 115° C.

*Example 13*

Into a 2-liter, 3-necked flask equipped with a stirrer, thermometer and reflux condenser, were placed 200 ml. of water, 43 grams (.5 mol) of 1.4-butynediol, 50 ml. (.86 mol) of 50% aqueous sodium hydroxide and 98 grams (.5 mol) of iron pentacarbonyl. Upon cautious heating to 55° C. a vigorous reaction takes place, causing the temperature to rise to 100° C. before a cooling bath could take effect. After the violence of the reaction had abated, the mixture was cooled to 20° C. and acidified to a pH of 3 with 75 ml. (88 mol) of concentrated hydrochloric acid. The insoluble material was filtered off and dissolved in warm methanol. The solution was filtered to give 9 grams of metallic iron. The filtrate was evaporated to dryness in vacuo, yielding 58.5 grams of a black brittle resin, soluble in dilute alkaline reagents, such as sodium hydroxide, ammonium hydroxide and sodium carbonate, acetic acid, acetone and dioxone, and insoluble in benzene and carbon tetrachloride. The product is a self-condensation polymer of the expected mixture of 4-hydroxy-2-butenal-1 and 1.4-butanedial (succindialdehyde).

Various modifications of the invention will occur to persons skilled in this art, and I therefore do not intend to be limited in the patent granted except as necessitated by the appended claims.

I claim:

1. The process of producing saturated aldehydes which comprises heating in the presence of an alkali an unsaturated alcohol selected from the class consisting of open chain and cyclic olefine alcohols and acetylenic alcohols with a metal carbonyl capable of forming metal hydrocarbonyls selected from the class consisting of iron and cobalt carbonyls.

2. The process as defined in claim 1 wherein the reaction temperature ranges from 60 to 100° C.

3. The process as defined in claim 1 wherein the reaction mixture containing an inert solvent is subjected to refluxing.

4. The process of converting allyl alcohol into saturated straight chain aldehydes which comprises heating the allyl alcohol in the presence of an aqueous alkali to a temperature of 60 to 100° C. in the presence of iron carbonyl.

5. The process as defined in claim 4 wherein the alkali is an aqueous solution of sodium hydroxide.

ROBERT THORWALD OLSEN.

REFERENCES CITED

The following references are of record in the file of this patent:

UNITED STATES PATENTS

| Number | Name | Date |
|---|---|---|
| 2,099,154 | Groll et al. | Oct. 26, 1937 |

OTHER REFERENCES

Mellor: "Comprehensive Treatise on Inorganic and Theoretical Chemistry," vol. 5, page 951, 1924, Longmans, Green & Co.